United States Patent [19]

Griffith et al.

[11] Patent Number: 4,663,677
[45] Date of Patent: May 5, 1987

[54] MAGNETIC DISK DRIVE HAVING A MOVABLE DRIVE MOTOR LOADING MECHANISM

[75] Inventors: David W. Griffith, Layton; Michael R. Lyon; Ross W. Bishop, both of Ogden; Edward H. Friery, Coalville, all of Utah

[73] Assignee: Iomega Corporation, Roy, Utah

[21] Appl. No.: 758,304

[22] Filed: Jul. 24, 1985

[51] Int. Cl.⁴ ............................................. G11B 5/016
[52] U.S. Cl. ........................................ 360/71; 360/99
[58] Field of Search ................... 360/97, 98, 99, 102, 360/131, 132, 133, 135, 71

[56] References Cited

U.S. PATENT DOCUMENTS

| | | | |
|---|---|---|---|
| 3,529,301 | 9/1970 | Hiruta | 340/174.1 |
| 3,593,327 | 7/1971 | Shill | 340/174.1 |
| 3,678,481 | 7/1972 | Dalziel et al. | 340/174.1 C |
| 3,696,350 | 10/1972 | Cohen et al. | 360/99 |
| 3,815,150 | 6/1974 | Stoddard et al. | 360/97 |
| 3,940,793 | 2/1976 | Bleiman | 360/99 |
| 3,947,886 | 3/1976 | Heidecker et al. | 360/99 |
| 3,951,264 | 4/1976 | Heidecker et al. | 206/444 |
| 3,959,823 | 5/1976 | Heidecker et al. | 360/99 |
| 3,975,768 | 8/1976 | Jacques et al. | 360/99 |
| 3,990,111 | 11/1976 | Elliott | 360/99 |
| 4,074,330 | 2/1978 | Norton et al. | 360/102 |
| 4,089,029 | 5/1978 | Castrodale et al. | 360/99 |
| 4,125,883 | 11/1978 | Rolph | 360/99 |
| 4,131,199 | 12/1978 | Hatchett et al. | 206/444 |
| 4,306,259 | 12/1981 | Saito et al. | 360/133 |
| 4,502,083 | 2/1985 | Bauck et al. | 360/99 |

FOREIGN PATENT DOCUMENTS 2309012 11/1976 France .
2460024 1/1981 France .

OTHER PUBLICATIONS

Disk Drive for Interchangeable Flexible Disk Cartridges, M. W. J. Carmichael and N. A. Feliss, vol. 20, No. 11A, April 1978, IBM Technical Disclosure Bulletin, pp. 4621-4622.

Primary Examiner—George G. Stellar
Attorney, Agent, or Firm—Woodcock Washburn Kurtz Mackiewicz & Norris

[57] ABSTRACT

A magnetic disk drive for writing and reading data to and from a magnetic disk contained in a cartridge which is inserted through an opening in the disk drive includes a drive motor rotated on a yoke by a manually operated shaft having a handle on one end and a cam on the other end. A flat diaphragm switch is operated by a rotation stop on the shaft to indicate when the motor is in the loaded position of engagement with the disk.

15 Claims, 6 Drawing Figures

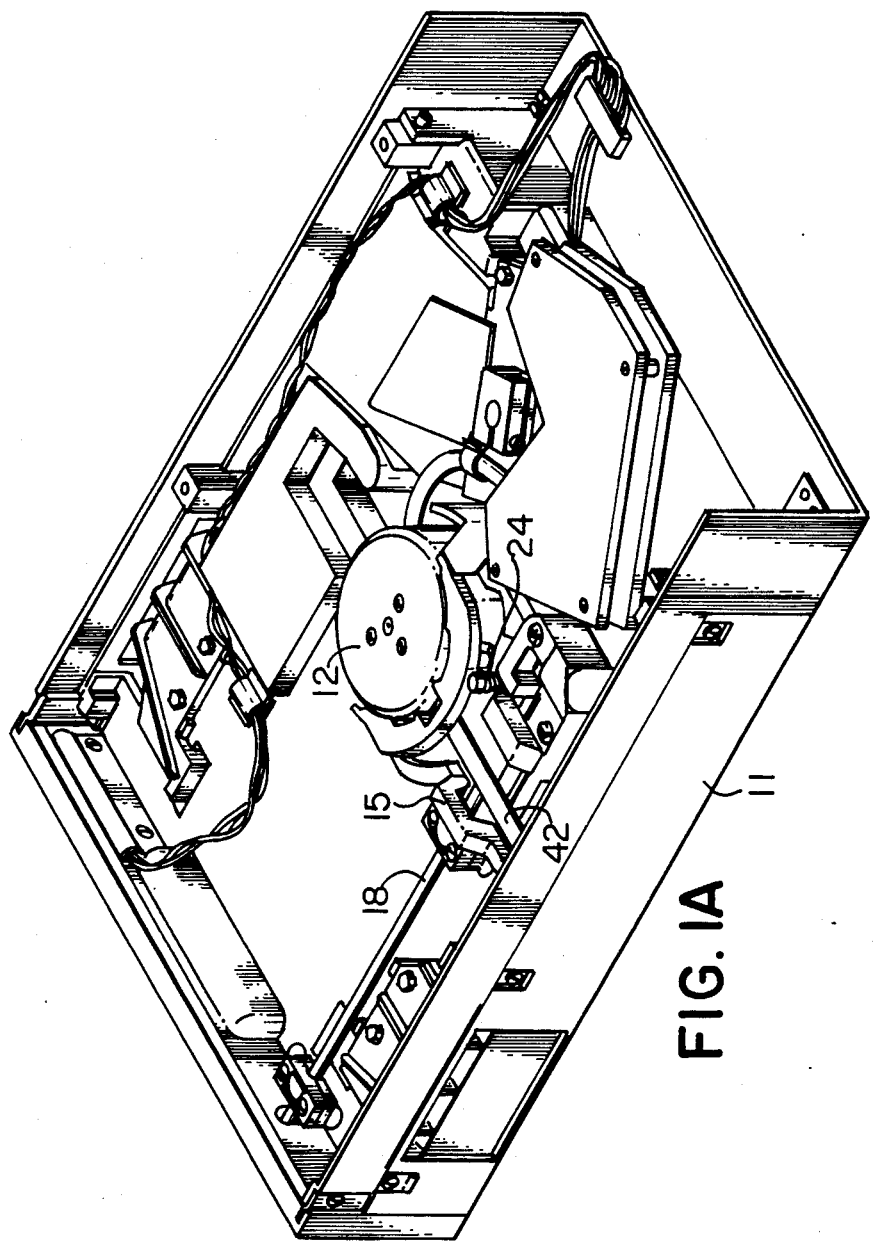

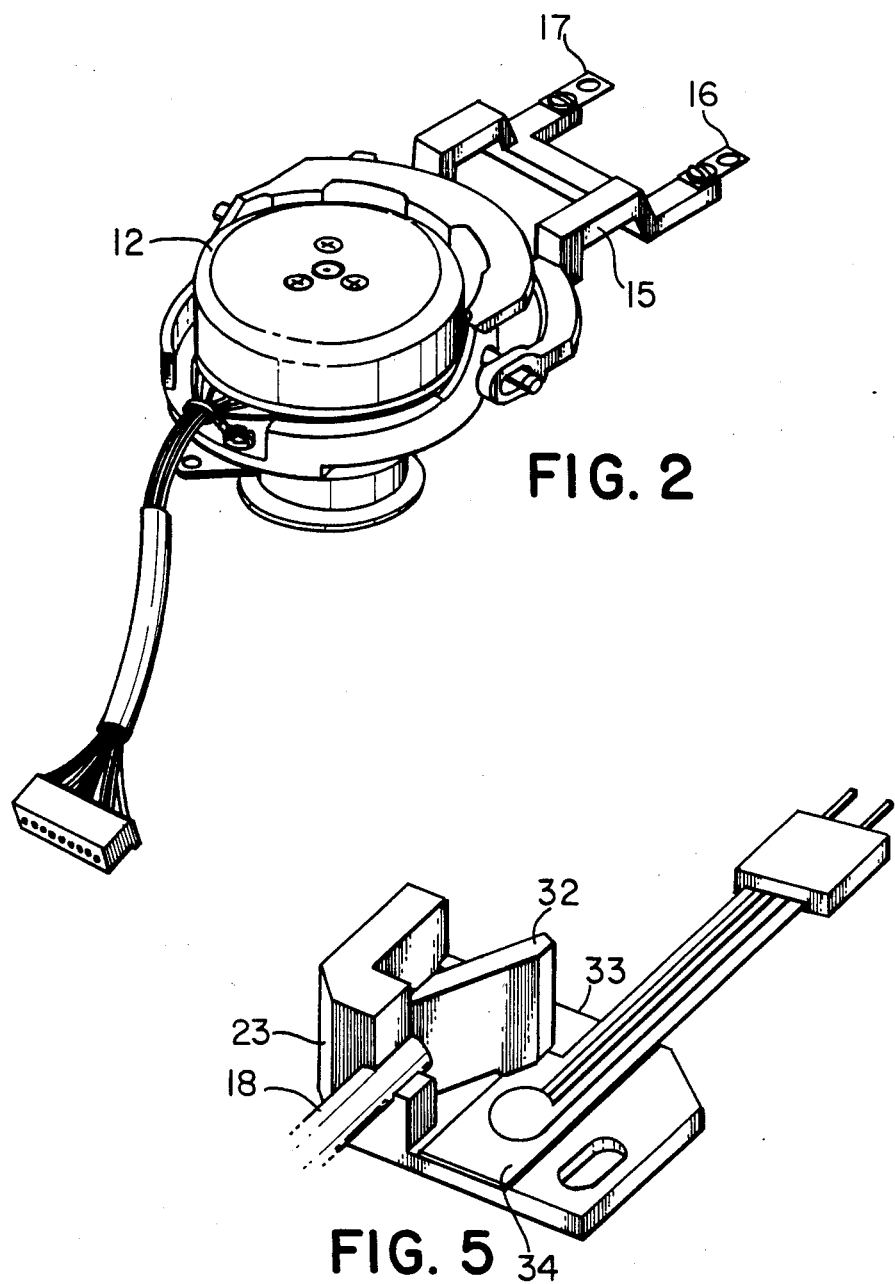

MAGNETIC DISK DRIVE HAVING A MOVABLE DRIVE MOTOR LOADING MECHANISM

BACKGROUND OF THE INVENTION

This invention relates to magnetic disk drives, and more particularly, to a loading mechanism for moving a motor into engagement with a magnetic disk which is rotated by the motor.

Recently, magnetic disk drives which write and read digital data from flexible magnetic disks have been extensively used. These are frequently referred to as "floppy" disks and "floppy disk drives." These drives have been extensively used for small, so-called microcomputer systems, for word processing applications, and the like.

In order to rotate the flexible magnetic disk in read-/write relationship with a magnetic recording head, a rotatable spindle must engage the center of the disk and disengage the disk when the operation has been completed. Floppy disk drives typically force and hold the disk center onto a fixed rotatable spindle by use of a clamp which comes from the back side of the disk. Since the actual drive spindle is fixed from translating, the critical dimensions from the hub center and hub height with respect to the recording head are fixed. However, this approach requires that the disk cartridge have an opening through which the clamp contacts and moves the media. The typical floppy disk cartridge exposes certain areas of the disk recording surface to dust contamination, liquid spillage, fingerprints, and scratching.

U.S. Pat. No. 4,400,748—Bauck et al shows a magnetic disk drive for reading and writing data from a magnetic disk in a rigid cartridge. The disk is rotated against a Bernoulli plate which gives the disk stability and the characteristics of a much larger, rigid media, drive. The magnetic disk is engaged by a drive motor and a recording head which extend through a common opening in the rigid disk cartridge.

U.S. Pat. No. 4,502,083, Bauck et al and Ser. No. 440,335, filed Nov. 9, 1982, commonly assigned, show a disk drive in which the motor is mounted on a yoke which is rotatable about a pivot in the disk drive. A bezel member mounted on the end of the yoke substantially closes the opening through which the magnetic disk cartridge is inserted into the drive. When the bezel member is moved by the operator out of this opening, in order to insert a cartridge, the motor is moved out of the position in which it will engage the magnetic disk.

These disk drives are packaged in racks or cabinets where space is at a premium. It is particularly desirable to reduce the height of the disk drive so that more drives can be located in the same available vertical space.

It is an object of the present invention to provide a disk drive with a substantially reduced height, for example, one half the height of that required in the aforementioned Bauck et al patents.

It is another object of the present invention to provide a motor loading mechanism for a disk drive which is reliable and which provides error-free operation by the user.

SUMMARY OF THE INVENTION

In accordance with the present invention, a magnetic disk drive has a drive motor mounted on a yoke rotatable by a manually operated shaft into a loaded position in which the drive motor engages a disk and an unloaded position in which the motor is out of engagement with the disk and in which the disk cartridge can be easily removed from or inserted into the disk drive.

The loading mechanism has an over-center action which provides two positive positions for the handle which operates the mechanism. A bias spring presses the drive motor against the means for guiding the motor into and out of engagement with the disk. This bias spring provides the aforementioned over-center action.

In accordance with an important feature of the invention, a sensor is actuated by the loading mechanism to indicate when the motor is in the loaded position. The sensor is a membrane switch positioned to be actuated by a rotation stop which is already present in the loading mechanism. The sensor produces a signal which indicates to the disk drive electronics that the drive motor has been loaded into its operating position. Parts of the loading mechanism serve the double function of actuating this sensor.

The foregoing and other objects, features and advantages of the invention will be better understood from the following more detailed description and appended claims.

SHORT DESCRIPTION OF THE DRAWINGS

FIG. 1A is a perspective view from the other side of the drive;

FIG. 2 shows the motor and yoke;

FIG. 5 shows the diaphragm switch.

DESCRIPTION OF THE PREFERRED EMBODIMENT

Figure 1:
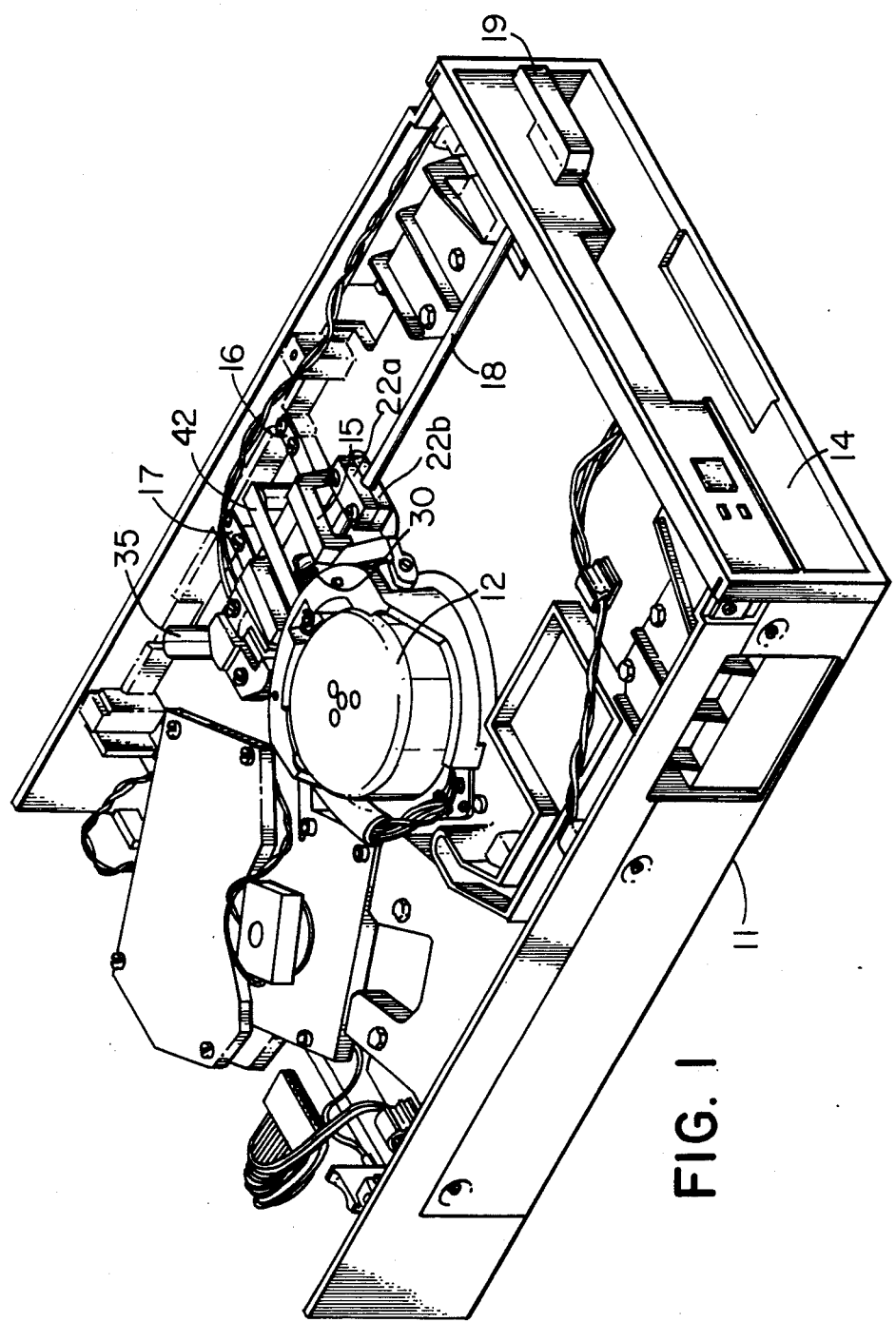
FIG. 1 is a perspective view of the loading mechanism of the present invention.

Referring to FIGS. 1 and 1A, the magnetic disk drive 11 includes a motor 12 having a spindle for rotating a magnetic disk which is contained in a cartridge inserted through opening 14 in the front of the drive. The motor 12 is mounted on a yoke 15 which is pivoted in the main frame by sheet metal flexures 16 and 17. The motor is mounted on the yoke so that rotation about the pivot moves the motor spindle into engagement with the disk and opposite rotation of the yoke moves the motor out of engagement with the disk. Cam 20 (FIG. 3) interfaces the yoke 15 and provides the force to overcome the load spring 24 (FIG. 1A) and unload the motor. Yoke 15 has a polyimide plastic bearing pad which interfaces with the cam 20 for low sliding friction.

A shaft 18 has a handle 19 on one end and cam 20 on the other end. The shaft is rotatably mounted in bearing members 21a and 21b, and in bearing members 22a and 22b, and in the end bearing 23. The cam 20 bears against yoke 15 to rotate it when the handle 19 is turned.

Load spring 24 (FIG. 1A) biases the yoke 15 toward engagment of the motor with the disk. When the handle 19 is rotated in a counter-clockwise direction, the cam 20 lifts the yoke so that the motor moves out of engagement with the disk.

Figure 4:
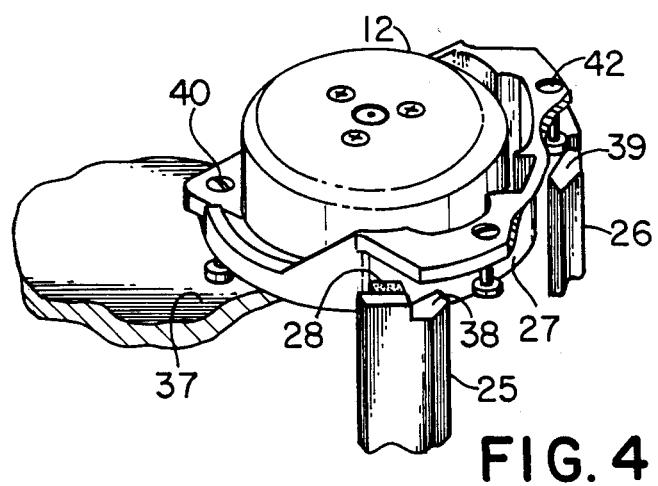
FIG. 4 shows the V blocks in which the motor slides and the reference surfaces.

The motor is guided into and out of engagement with the disk by V blocks 25 and 26, shown in FIG. 4. Motor 12 has a cast flange that has an accurately machined cylindrical surface 27 which interfaces with the V formed by the blocks 25 and 26 which are mounted on the main frame. The guiding V includes two polymide plastic low friction bearing pads, one of which is indicated at 28 in FIG. 4. The bearing pads are machined after bonding to maintain accuracy. Alternatively, the bearing pads may be ground, then glued onto an accurately machined casting. The motor slides in the V between two positions, the loaded position, in which the motor engages the disk to rotate it and the unloaded position in which the motor is moved so as not to obstruct the insertion or removal of the disk cartridge.

The motor must be accurately moved into the loaded position so that a motor ring magnet on the motor spindle successfully engages the disk hub and so that the disk is accurately positioned with respect to the recording head.

Motor 12 is held in the V blocks 25 and 26 by bias spring 30. (FIGS. 1 and 3) The bias spring is attached to the motor flange and to a bend 31 in the shaft 18. To load the motor, the user rotates the handle 19, which rotates the cam 20 allowing the motor to slide against the V blocks. As the motor slides, the bias spring 30 stays normal to the motor because the bend 31 in the shaft moves in the same direction that the motor is sliding, that is toward or away from the main frame. When moving toward the loaded position in which the motor engages the disk, the shaft 18 is also extending the bias spring 30. The handle 19 is rotated until a rotation stop 32 (FIGS. 3 and 5) contacts the end bearing plate 33.

The bend 31 in the load shaft 18 is formed out of the plane of the rotation stop 32 so that the bias spring 30 provides an over center action with two positions, loaded or unloaded. This returns the handle to either the loaded or unloaded position, if it is left in between. This is important so that the user does not try to operate a partially loaded drive or take the cartridge out of a drive with a partially unloaded motor.

Figure 3:
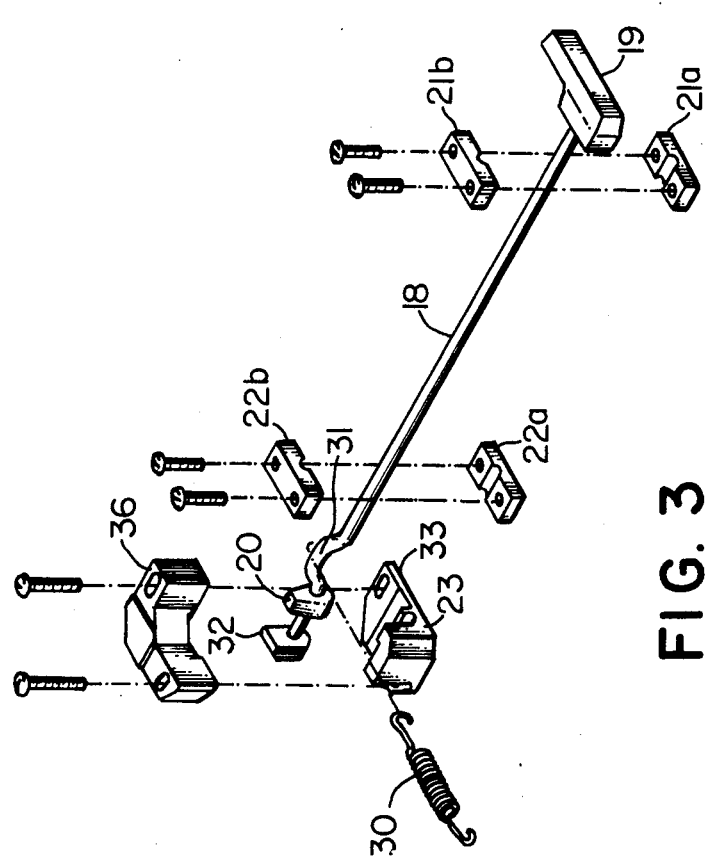
FIG. 3 is an exploded view showing the shaft, rotation stop and bearings.

As best shown in FIG. 5, a sensor 34 produces a signal indicating to the disk drive electronics that the drive motor has been loaded into operating position. When the handle has been rotated by 90° to load the motor, rotation stop 32 makes contact with the sensor 34 which is mounted on the end bearing plate 33. Sensor 34 is a keyboard-type membrane switch mounted so that it is sandwiched when the motor is loaded. It acts as a limit switch when the rotation stop depresses it, thereby closing a circuit allowing passage of an electrical signal indicating that the motor is in the loaded position. This signals the disk drive electronics to proceed with operation. When the user rotates the knob to unload the motor, sensor 34 returns to its open circuit position. The membrane switch sensor is particularly suitable for use because it requires very little space, no special mounting brackets, screws, or surfaces. Due to the simplicity of the sensor, advantage is taken of parts such as the rotation stop which are already required, and thus serve a double function. A solenoid 35 (FIG. 1) is mounted on the solenoid bracket 36 (FIG. 3). The solenoid is energized to trap the rotation stop 32 so that the user cannot unload a motor during drive operation.

During non-operation the drive has no severe shock-/vibration requirements. This is when the bias spring 30 tension is minimum, and therefore the sliding friction at the V blocks 25 and 26 is also minimum. The bend 31 in the shaft 18 allows the bias spring 30 to relax. The bias spring does supply enough force to keep the cam-/yoke/motor in the unloaded position until the handle is rotated. In the loaded position, the bias spring tension provides enough load shaft torque to keep sensor 34 actuated.

The motor hub has a rubber urethane surface which must be accurately positioned with respect to the Bernoulli plate which is important to the function of the disk. The urethane positioning is accomplished by a three point datum system set by reference surfaces 37–39 (FIG. 4). The motor shaft diameter is located in the X and Y axes by the V blocks 25 and 26; the urethane is positioned in the Z axis by the three point datum system. To allow for greater manufacturing tolerances the three points are established by stops which are set by adjustable screws 40–42 (FIG. 4). The urethane surface is set for Bernoulli plate penetration and paralellism by adjusting the three screw stops.

Because it would be impossible to be both fully seated in the V block and fully seated on all three datums in the loaded position, a cantilever spring 43 (FIG. 1) acts to rock the motor out of the V block as needed and allows the three datums to establish motor position. The V blocks still locate X and Y location by a point contact at each bearing, while at all other times in the load/unload cycle, the contact at each bearing is a line contact. The V block bearings are machined with an intentional lean back angle so that the cantilever spring always rocks the motor to load the third datum (opposite the V blocks) last.

While a particular embodiment of the invention has been shown and described, various modifications are within the true spirit and scope of the invention. The claims are, therefore, intended to cover all such modifications.

What is claimed is:

1. A magnetic disk drive for writing and reading data to and from a magnetic disk contained in a cartridge which is inserted through an opening into said disk drive comprising:
    a yoke rotatable about a pivot in said disk drive;
    a motor having a spindle for engaging said magnetic disk to rotate it, said motor being mounted on said yoke so that rotation about said pivot moves said motor out of engagement with said disk and opposite rotation of said yoke moves said motor into engagement with said disk; and
    a shaft having a handle on one end and a cam on the other end, said shaft being rotatably mounted so that said cam bears against said yoke to rotate it when said handle is turned.

2. The disk drive recited in claim 1 further comprising:
    a rotation stop on said shaft; and
    a sensor actuated by said stop when said motor is in engagement with said disk drive to produce a signal indicating said engagement.

3. The disk drive recited in claim 2 wherein said shaft rotates in an end bearing, said sensor being mounted on said end bearing, and wherein said rotation stop engages said sensor on said end bearing when said motor is in engagement with said disk drive.

4. The disk drive recited in claim 3 wherein said sensor is a flat diaphragm switch mounted on a flat surface of said end bearing.

5. The magnetic disk drive recited in claim 1 further comprising:
    a load spring biasing said yoke toward engagement of said motor with said disk and wherein said cam moves said yoke out of said engagement when said handle is turned.

6. The magnetic disk drive recited in claim 1 further comprising:
means for guiding said motor into and out of engagement with said disk.

7. The disk drive recited in claim 6 wherein said motor has a cylindrical surface and wherein said means for guiding includes blocks which form a V against which said motor slides into and out of engagement with said disk.

8. The disk drive recited in claim 6 and a bias spring biasing said motor against said means for guiding said motor.

9. The disk drive recited in claim 8 wherein said shaft has a bend therein and wherein said bias spring is connected between said bend and said motor, said bend and said bias spring providing two over-center positions of said motor, in engagement with said disk and out of engagement with said disk.

10. The disk drive recited in claim 9 wherein said bias spring is connected normal to the axis of said motor, thereby pulling said motor against said means for guiding throughout its travel into and out of engagement with said disk.

11. The disk drive recited in claim 10 wherein said bend moves in the same direction that said motor is sliding when said shaft is rotated so that the bias spring force pulls said motor directly into said means for guiding throughout the length of travel of said motor.

12. The disk drive recited in claim 1 further comprising:
a solenoid which is actuated when said motor engages said disk, said solenoid trapping said rotation stop to prevent disengagement of said motor from said disk during operation.

13. The disk drive recited in claim 7 further comprising:
reference surfaces for accurately setting the position of the motor in the loaded position.

14. The disk drive recited in claim 13 and a cantilever spring connected to said motor to rock the motor out of said blocks to allow the reference surfaces to establish motor position 15. The disk drive recited in claim 14 wherein said reference surfaces comprise:
three reference surfaces; and
adjustable stops on said motor setting the position at which said stops engage said reference surfaces.

* * * * *